US012570046B2

(12) United States Patent
Rolink et al.

(10) Patent No.: US 12,570,046 B2
(45) Date of Patent: Mar. 10, 2026

(54) METHOD AND APPARATUS FOR PRODUCING A THREE-DIMENSIONAL WORKPIECE VIA ADDITIVE LAYER MANUFACTURING

(71) Applicant: Nikon SLM Solutions AG, Luebeck (DE)

(72) Inventors: Gesa Rolink, Luebeck (DE); Jiachun Chen, Luebeck (DE); Andreas Hoppe, Luebeck (DE); Lukas Roesgen, Luebeck (DE); Dieter Schwarze, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 295 days.

(21) Appl. No.: 17/926,338

(22) PCT Filed: May 5, 2021

(86) PCT No.: PCT/EP2021/061786
§ 371 (c)(1),
(2) Date: Nov. 18, 2022

(87) PCT Pub. No.: WO2021/239411
PCT Pub. Date: Dec. 2, 2021

(65) Prior Publication Data
US 2023/0191699 A1     Jun. 22, 2023

(30) Foreign Application Priority Data

May 28, 2020     (DE) ..................... 10 2020 114 340.0

(51) Int. Cl.
B29C 64/282     (2017.01)
B29C 64/371     (2017.01)
(Continued)

(52) U.S. Cl.
CPC .......... B29C 64/282 (2017.08); B29C 64/371 (2017.08); B29C 64/393 (2017.08);
(Continued)

(58) Field of Classification Search
CPC ... B29C 64/282; B29C 64/371; B29C 64/393; B33Y 10/00; B22F 10/366; B22F 10/28
See application file for complete search history.

(56) References Cited

U.S. PATENT DOCUMENTS 5,182,055 A     1/1993  Allison et al.
10,399,146 B2   9/2019  Giulietti
(Continued)

FOREIGN PATENT DOCUMENTS

CN      103846437     6/2014
CN      108437455     8/2018
(Continued)

OTHER PUBLICATIONS

European Patent Office, International Search Report for International Application No. PCT/EP2021/061786, Jul. 22, 2021.
(Continued)

*Primary Examiner* — Galen H Hauth
*Assistant Examiner* — Mohamed K Ahmed Ali
(74) *Attorney, Agent, or Firm* — Williams Mullen; Thomas F. Bergert

(57)     ABSTRACT

We describe a method comprising: defining an irradiation section, in particular an irradiation stripe, on a material layer to be irradiated, in an additive layer manufacturing process, with an irradiation beam scanned across the material layer, and defining, within the irradiation section, two or more parallel or substantially parallel scanning vectors for said scanning of a said irradiation beam across the material layer, wherein all scanning vectors within the irradiation section
(Continued)

are parallel or substantially parallel with respect to each other, wherein, based on said defining of the two or more parallel or substantially parallel scanning vectors, a line results which connects a first location, on the material layer, of a change in irradiation energy density of a said irradiation beam for a first one of the two or more parallel or substantially parallel scanning vectors and a second location, on the material layer, of a change in irradiation energy density of a said irradiation beam for a second one of the two or more parallel or substantially parallel scanning vectors, wherein the first scanning vector and the second scanning vector are neighboring scanning vectors, wherein a distance between the first location and the second location is smaller than (i) a distance between the first location and a third location of a change in irradiation energy density of a said irradiation beam for the second one of the two or more parallel or substantially parallel scanning vectors and/or (ii) a distance between the second location and a fourth location of a change in irradiation energy density of a said irradiation beam for the first one of the two or more parallel or substantially parallel scanning vectors, and wherein an angle, which differs from 90 degrees (a) irrespectively of a geometry of a workpiece to be produced using the additive layer manufacturing process, and (b) irrespectively of an orientation of the two or more parallel or substantially parallel scanning vectors with respect to an orientation of the irradiation section, is formed (i) between the first scanning vector and the line, and/or (ii) between the second scanning vector and the line.

16 Claims, 7 Drawing Sheets

(51) Int. Cl.

| | |
|---|---|
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0303805 A1 | 10/2016 | Chen et al. | |
| 2017/0197248 A1* | 7/2017 | Giulietti | B22F 12/90 |
| 2018/0185961 A1 | 7/2018 | Meidani et al. | |
| 2018/0250743 A1 | 9/2018 | Mamrak et al. | |
| 2020/0033835 A1 | 1/2020 | Heikkinen et al. | |
| 2020/0101671 A1 | 4/2020 | Madigan et al. | |

FOREIGN PATENT DOCUMENTS

| | | |
|---|---|---|
| CN | 108681130 | 10/2018 |
| CN | 109530686 | 3/2019 |
| CN | 110545986 | 12/2019 |
| CN | 110573278 | 12/2019 |
| CN | 110621425 | 12/2019 |
| CN | 111203536 | 5/2020 |
| DE | 102011087374 | 5/2013 |
| DE | 102017207264 | 10/2018 |
| EP | 3459655 | 3/2019 |
| WO | 2004056510 | 7/2004 |
| WO | 2018164774 | 9/2018 |
| WO | 2018184726 | 10/2018 |
| WO | 2019094291 | 5/2019 |

OTHER PUBLICATIONS

German Patent and Trademark Office, German Search Report for DE Patent Application No. 10 2020 114 340.0, Sep. 2, 2021.
China National Intellectual Property Administration, Examination Report for International Patent Application No. CN 202180049534. 1, Jul. 15, 2024.
Japanese Patent Office, JP Examination Report for International Patent Application No. JP 2022-572729, Jan. 9, 2024.
China National Intellectual Property Administration, Examination Report for Chinese Patent Application No. CN 202180049534.1, Feb. 17, 2025.

* cited by examiner

Defining irradiation section (S1102)

↓

Defining scanning vectors (S1104)

↓

Irradiating material layer according to scanning vectors (S1106)

1100

METHOD AND APPARATUS FOR PRODUCING A THREE-DIMENSIONAL WORKPIECE VIA ADDITIVE LAYER MANUFACTURING

CROSS-REFERENCE TO RELATED APPLICATIONS

This application is the U.S. national phase of international application PCT/EP2021/061786, filed on May 5, 2021, which claims the benefit of German application DE 10 2020 114 340.0 filed on May 28, 2020; all of which are hereby incorporated herein in their entireties by reference.

The present invention generally relates to a method in which two or more scanning vectors used for irradiating a material layer in an additive layer manufacturing process are defined, a computer program product comprising program portions for performing the method when the computer program product is executed on one or more computing devices, an apparatus for producing a three-dimensional workpiece via an additive layer manufacturing method, and a method comprising providing data for implementing the aforesaid method using an apparatus for producing a three-dimensional workpiece via an additive layer manufacturing method.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser radiation in a site selective manner in dependence on the desired geometry of the workpiece that is to be produced. The laser radiation penetrating into the powder layer causes heating and consequently melting or sintering of the raw material powder particles. Further raw material powder layers are then applied and processed successively to the layers on the carrier that have already been subjected to laser treatment, until the workpiece has the desired shape and size. Selective laser melting or laser sintering can be used in particular for the production of prototypes, tools, replacement parts or medical prostheses, such as, for example, dental or orthopedic prostheses, on the basis of CAD data.

On the other hand, fused deposition modeling or material jetting represent different types of additive layering processes. In this case, non-solidified raw material is supplied to a type of printing head which deposits said material onto a carrier where it then solidifies.

An important parameter of additive layer construction methods is the quality of the produced workpieces. As quality may be affected by various parameters, known solutions do not always achieve the desired quality.

Currently, stripe widths (in which scanning vectors for scanning an irradiation beam across a material layer) are defined in stripe scan strategies. Within these stripes there are scanning vectors of equal or varying length depending on the workpiece geometry. The starting points and endpoints of the scanning vectors are always next to each other and form a line between the stripes, substantially independent of the workpiece geometry (see FIG. 1). In most cases stripes inside a workpiece comprise vectors of substantially equal length, whereas stripes in a workpiece contour area comprise vectors of varying length in dependence of the workpiece geometry.

The overlap or distance between two stripes can be adjusted by means of a stripe offset. A positive value of the stripe offset results in a distance between two stripes, a negative value of the stripe offset results in an overlap.

The inventors have realized that if this value is not optimally set or if the size of the melt pool increases during the additive layer manufacturing process due to environmental influences (for example a change in gas flow, pressure fluctuations, etc.), defects or pores can occur if the overlap or the distance between two stripes is too large (see dots in FIG. 1). As the starting points and endpoints of the scanning vectors lie on a line, several linearly arranged defects or pore chains may be created (see the line of dots in the encircled area in FIG. 1).

The inventors have thus realized that while statistically distributed pores or defects may not degrade workpiece quality to some extent, the linear arrangement of defects or pores should be avoided. This is because if such linear arrangement of defects or pores are present once or several times in a workpiece, this may lead to early mechanical failure of the workpiece since defect or pore chains form linear defects, possibly cracks and a kind of predetermined breaking point under load, unlike statistically distributed pores.

It is therefore an object of the present invention in particular to improve quality of three-dimensional workpieces produced using an additive layer manufacturing technique.

The invention is set out in the independent claims. Preferred embodiments of the invention are outlined in the dependent claims.

We describe a method comprising: defining an irradiation section, in particular an irradiation stripe, on a material layer to be irradiated, in an additive layer manufacturing process, with an irradiation beam scanned across the material layer, and defining, within the irradiation section, two or more parallel or substantially parallel scanning vectors for said scanning of a said irradiation beam across the material layer, wherein all scanning vectors within the irradiation section are parallel or substantially parallel with respect to each other, wherein, based on said defining of the two or more parallel or substantially parallel scanning vectors, a line results which connects a first location, on the material layer, of a change in irradiation energy density of a said irradiation beam for a first one of the two or more parallel or substantially parallel scanning vectors and a second location, on the material layer, of a change in irradiation energy density of a said irradiation beam for a second one of the two or more parallel or substantially parallel scanning vectors, wherein the first scanning vector and the second scanning vector are neighboring scanning vectors, wherein a distance between the first location and the second location is smaller than (i) a distance between the first location and a third location of a change in irradiation energy density of a said irradiation beam for the second one of the two or more parallel or substantially parallel scanning vectors and/or (ii) a distance between the second location and a fourth location of a change in irradiation energy density of a said irradiation beam for the first one of the two or more parallel or substantially parallel scanning vectors, and wherein an angle, which differs from 90 degrees (a) irrespectively of a geometry of a workpiece to be produced using the additive layer manufacturing process, and (b) irrespectively of an orientation of the two or more parallel or substantially parallel scanning vectors with respect to an orientation of the irradiation section, is formed (i) between the first scanning vector and the line, and/or (ii) between the second scanning vector and the line.

The angle being different from 90 degrees irrespectively of a geometry of a workpiece to be produced using the additive layer manufacturing process means, for example, that the angle differs from 90 degrees irrespectively of where the two or more parallel or substantially parallel scanning vectors are arranged on the material layer when producing the workpiece. In particular, the angle being different from 90 degrees irrespectively of a geometry of a workpiece to be produced using the additive layer manufacturing process means, for example, that the angle differs from 90 degree irrespectively of whether or not the two or more parallel or substantially parallel scanning vectors are defined on a contour or in a contour area of the workpiece (i.e. irrespectively of whether the irradiation section within which the two or more parallel or substantially parallel scanning vectors are defined is defined for a contour or contour area of the workpiece). As will be appreciated, at a contour or contour area, scanning vectors may be defined with a length which may be shorter than scanning vectors defined in a non-contour area.

The angle being different from 90 degrees irrespectively of an orientation of the two or more parallel or substantially parallel scanning vectors with respect to an orientation of the irradiation section means, for example, that the angle differs from 90 degrees irrespectively of whether the scanning vectors are defined such that they are parallel or substantially parallel with one or more of the edges of the irradiation section or whether the scanning vectors are not parallel or substantially parallel with the one or more of the edges of the irradiation section. In some examples, the irradiation section may be defined as a square or a rectangular irradiation section, such that the scanning vectors within the irradiation can be parallel (or substantially parallel) with an edge of the square-shaped or rectangularly shaped irradiation section, or the scanning vectors are at an angle with (i.e. not parallel with) the edge of the irradiation section. However, according to example implementations as described herein, the angle differs from 90 degrees in this example (with a square-shaped or rectangularly shaped irradiation section) irrespectively of whether the scanning vectors are parallel with the edge of the irradiation section or not.

In some examples, the orientation of the irradiation section is defined based on the edges of the irradiation, for example when the irradiation section is square-shaped or rectangularly shaped. In other examples, the irradiation section may be oval-shaped, such that the orientation of the irradiation section may be defined via the long and short axes of the oval-shaped irradiation section.

Using this method, linearly arranged pores or defects may thus be avoided (at least to some extent), thereby improving quality of the workpiece produced using the additive layer manufacturing process. This is because a change in irradiation energy density of the irradiation beam (in some examples from a value of zero to a value larger than zero of the irradiation energy density or vice versa, or alternatively or additionally from a first value other than zero to a second value other than zero and smaller or larger than the first value) may cause a pore or defect to ultimately occur in the solidified material.

A change of the irradiation energy density could be achieved for example by changing the power of the energy sources, a change of the beam diameter in the working plane (i.e. the size of the beam spot on the working plane), a change of the moving speed or trajectory of the beam spot, a distance between neighboring vectors (i.e. neighboring traces of movement), an overlap of neighboring traces of irradiation resulting from the distance between neighboring vectors and the size of the beam spot, and the number of scanning vectors in an irradiation section. For a change of the irradiation energy density one, more or all of the preceding parameters could be changed.

In some examples, only a fraction of all scanning vectors are defined within the irradiation section such that the above-identified condition in that the angle which is formed between a said scanning vector and the line differs from 90 degrees. In some other examples, all (neighboring) scanning vectors within the irradiation section are defined such that the above-identified condition in that the angle which is formed between a said scanning vector and the line differs from 90 degrees.

Example implementations of the method as described herein therefore allow for ensuring respective locations of a change in irradiation energy density to be varied between neighboring parallel or substantially parallel scanning vectors. A linear pore or defect chain may thus be avoided, thereby improving quality of the three-dimensional workpiece to be produced using the additive layer manufacturing process.

In some examples of the method and as outlined above, a said angle differing from 90 degrees is formed based on each pair of neighboring scanning vectors of the two or more scanning vectors. This may allow for ensuring that linear pore or defect chains are avoided within the entire irradiation section.

In some examples of the method, the angle differs from 90 degrees by at least 5 degrees, preferably by at least 10 degrees, and more preferably by at least 15 degrees. The variation of the first location and the second location of the respective change in irradiation energy density for the first one and the second one, respectively, of the two or more scanning vectors may be increased, thereby providing said locations on the material layer such that the arrangement may be as different as possible from a linear arrangement. Therefore, a linear pore or defect chain is avoided as much as possible, thereby improving quality of the three-dimensional workpiece to be produced using the additive layer manufacturing process.

In some examples of the method, a said change in irradiation energy density comprises a said scanning vector starting and/or ending at a respective said location. The method may hereby be particularly advantageous since pores and defects may in particular occur when the irradiation beam first impinges on the material layer and/or when the irradiation beam at a certain location no longer impinges on the material layer (i.e. the irradiation beam is stopped from being scanned across the material layer). These potentially severe pores and/or defects may thus be avoided to be located on the solidified material in a linear arrangement.

In some examples of the method, the angle being formed to be different from 90 degrees is based on a) defining the first one and the second one of the two or more parallel or substantially parallel scanning vectors to have (i) different respective lengths and/or (ii) different respective starting points and/or (iii) different respective endpoints, and/or b) a said starting point of one of the first one and the second one of the scanning vectors being different from a said endpoint of the other one of the first one and the second one of the scanning vectors. The respective starting points of the first one and the second one of the two or more scanning vectors being different may hereby relate to a connection between the respective starting points not being perpendicular to the first one of the two or more scanning vectors and/or not being perpendicular to the second one of the two or more scanning vectors. Similarly, the respective endpoints of the first one and the second one of the two or more scanning vectors being different may relate to a connection between the respective endpoints not being perpendicular to the first one of the two or more scanning vectors and/or not being perpendicular to the second one of the two or more scanning vectors. Similarly, a starting point of one of the first one and the second one of the two or more scanning vectors being different from an endpoint of the other one of the first one and the second one of the two or more scanning vectors may relate to a connection between the starting point and the endpoint not being perpendicular to the first one of the two or more scanning vectors and/or not being perpendicular to the second one of the two or more scanning vectors. Using this example implementation of the method, a chain of pores and/or defects may be avoided, thereby improving quality of the three-dimensional workpiece to be produced using the additive layer manufacturing process.

In some examples, the method further comprises defining an area within the irradiation section, wherein the first location and the second location are located within the area along respective straight lines on which the respective first one of the two or more scanning vectors and the second one of the two or more scanning vectors are defined. Pore and/or defect chains may be avoided by defining the starting points and the endpoints (or, generally, the respective locations of a change in irradiation energy density) of the scanning vectors within this area within the irradiation section such that the condition with respect to the angle between the first scanning vector and the line and/or between the second scanning vector and the line being different from 90 degrees is fulfilled.

In some examples of the method, the first location and the second location are arranged randomly within the area. Based on a random arrangement of the first and second locations within the area, pore and/or defect chains may be avoided in view of the stochastic arrangement.

In some examples of the method, the first location and the second location are distributed uniformly within the area, thereby advantageously avoiding pore and/or defect chains within the area. A uniform distribution may comprise a mean distance between the locations (for example between said locations of a change in irradiation energy density of all scanning vectors within the area) being above a threshold distance.

In some examples of the method, a connection of a said location of every second scanning vector forms a straight line. For one or more of the scanning vectors, a starting point may be located on the straight line, while for another one or more of the scanning vectors, an endpoint may be located on the straight line. In some examples, two straight lines may be formed, a first straight line based on a first set of scanning vectors (for example a first scanning vector, a third scanning vector, a fifth scanning vector, etc.), and a second straight line based on a second set of scanning vectors (for example a second scanning vector, a fourth scanning vector, a sixth scanning vector, etc.). This advantageously allows for a distribution of said locations of a respective change in irradiation energy density of a said irradiation beam which avoids interconnected linear pores and/or defect chains within the area.

In some examples of the method, said locations are located on the material layer according to a wave-like curve, in particular a sinusoidal curve. Linear pore and/or defect chains may thus be avoided in the solidified material layer.

In some examples of the method, said locations are located on the material layer according to a zick-zack pattern. Linear pore and/or defect chains may thus be avoided in the solidified material layer at least to some extent by offsetting a said location for every x-th scanning vector by a defined magnitude.

In some examples of the method, a distance between the first location and the second location is above a predefined threshold. Linear pore and/or defect chains may hereby be avoided due to the first location and the second location being arranged apart from each other at least to some extent.

In some examples of the method, a length of each of the two or more scanning vectors is (I) equal to or larger than a minimum length, and/or (ii) equal to or smaller than a maximum length. This allows to ensure that the energy input does not vary too much (i.e. too frequently) or not frequently enough, which may otherwise cause for other possible defects to occur in the solidified material layer.

In some examples of the method, a dimension of the area equals to a difference between the maximum length and the minimum length. The area within which the first location and the second location are located may be defined while taking into account the minimum and maximum length of the scanning vectors.

In some examples, the method further comprises irradiating the material layer with the irradiation beam according to the two or more scanning vectors.

In some examples of the method, the irradiation section is defined to comprise a contour area, in particular an overhanging contour area, of the workpiece to be produced from the material layer using the additive layer manufacturing process. It may hereby be particularly advantageous to avoid any linear pore and/or defect chains along the contour of the workpiece or in an area in which the contour is arranged. This may in particular allow for reducing the extent as to which any supporting features are provided in the overhanging contour area of the workpiece to be produced. As overhanging contour area is understood an area which lies above unsolidified powder instead of above a solidified part of the workpiece, in literature this is also referred to as overhang or downskin.

In some examples of the method, the irradiation section is defined to comprise an underlying contour area of the workpiece. It may hereby be particularly advantageous to avoid any linear pore and/or defect chains along the contour of the workpiece or in an area in which the contour is arranged. As underlying contour area is understood an area which lies after processing the following layer under unsolidified powder instead of inside a solidified part of the workpiece, in literature this is also referred to as upskin.

In some examples of the method, when the irradiation section is defined to comprise a said overhanging contour area and when an overhang angle (defined with respect to a vertical direction in which the layer-by-layer production of the three-dimensional workpiece is to be produced) of the overhanging contour area is above a threshold angle, said irradiation comprises a unidirectional irradiation towards the overhanging contour. The threshold angle could depend from material and/or layer thickness and/or irradiation source parameters and for example could preferably be less than 65°, more preferably less than 50°, most preferably less than 40°. This allows for uniform irradiation in an area which includes the overhanging contour area, thereby resulting in improved quality of the workpiece in this area.

In some examples of the method, a starting point of a said scanning vector in an area in which the overhanging area is to be formed from the material layer is located where material has been solidified in a layer lying directly underneath the material layer, and wherein an endpoint of the scanning vector is located where material has not been solidified in the layer lying directly underneath the material layer. A starting point of a scanning vector at a location where material has been solidified in the layer lying directly underneath the material layer to be solidified according to said scanning vector may result in no or lesser defects and/or pores compared to when the starting point were located where the layer lying underneath the material layer to be solidified has not been solidified. This may be due to non-solidified material essentially acting as an isolating layer, and non-solidified material underneath the layer to be solidified resulting in the solidified layer (with a higher density compared to the non-solidified material) sinking into the non-solidified layer. This may thus be prevented, such that quality of the workpiece may be improved.

In some examples of the method, when the irradiation comprises a bidirectional irradiation, a length of a said scanning vector pointing towards a center or center region of the workpiece is above a threshold length and/or wherein a said irradiation energy density increases from a starting point of the scanning vector to an endpoint of the scanning vector pointing towards the center or center region of the workpiece. Quality of the workpiece may thus be improved as anomalies (e.g. defects and/or pores) may be avoided. This may be particularly the case for irradiation sections with a width below a threshold, such that short scanning vectors may be merged with a neighboring irradiation section/scanning vector.

In some examples of the method, when the irradiation beam is scanned across the material layer at a location at which material underneath the material layer has already been solidified but within a predefined distance from a location at which material underneath the material layer has not yet been solidified, a said first and/or second location of a said change in irradiation energy density is defined on the material layer at a said location at which material underneath the material layer has already been solidified. This may result in no or lesser defects and/or pores compared to when a said location were located where the layer lying underneath the material layer to be solidified has not been solidified. Quality of the workpiece may thus be improved. In some examples, two scanning vectors may be arranged one after the other within the irradiation section, whereby the irradiation beam energy density is reduced for the first vector lying in an area underneath which the material is solid, and whereby the second scanning vector covers the overhanging area and commences with the reduced irradiation beam energy density.

We further describe a method, comprising:

defining an irradiation section, in particular an irradiation stripe, on a material layer to be irradiated, in an additive layer manufacturing process, with an irradiation beam scanned across the material layer, and defining, within the irradiation section, three or more parallel or substantially parallel scanning vectors for said scanning of a said irradiation beam across the material layer, wherein all scanning vectors within the irradiation section are parallel or substantially parallel with respect to each other, wherein, based on said defining of the three or more parallel or substantially parallel scanning vectors, results a first location, on the material layer, of a change in irradiation energy density of a said irradiation beam for a first one of the three or more parallel or substantially parallel scanning vectors, a second location, on the material layer, of a change in irradiation energy density of a said irradiation beam for a second one of the three or more parallel or substantially parallel scanning vectors, and a third location, on the material layer, of a change in irradiation energy density of a said irradiation beam for a third one of the three or more parallel or substantially parallel scanning vectors, wherein the first scanning vector, the second scanning vector and the third scanning vector are neighboring scanning vectors, wherein the first location, the second location and the third location lie on a same side in relation to a curve through the (respective) centers of the first scanning vector, the second scanning vector and the third scanning vector, wherein a first straight line results connecting the first location and the second location and a second straight line results connecting the first location and the third location, and wherein the first straight line and the second straight line are not parallel.

This method may be combined with any one or more of the example implementations as described throughout the entire disclosure, and in particular with the previously described examples of the method.

In some examples of the method, the irradiation section is defined to comprise a contour area, in particular an overhanging or underlying contour area, of the workpiece to be produced from the material layer using the additive layer manufacturing process.

In some examples of the method, when the irradiation section is defined to comprise a said contour area, the first location, the second location and the third location in relation to a curve through the (respective) centers of the first vector, the second vector and the third vector, lie on the opposite side of the curve as the contour of the workpiece.

In some examples of the method, all parallel straight lines of the first straight line are not tangent to the course of the workpiece contour. In some examples of the method, all parallel straight lines of the second straight line are not tangent to the course of the workpiece contour. In some examples of the method, all parallel straight lines of the first straight line and all parallel straight lines of the second straight line are not tangent to the course of the workpiece contour.

We further describe a computer program product comprising program code portions for performing the method as outlined according to any one or more of the example implementations as described throughout the present disclosure when the computer program product is executed on one or more computing devices. In some examples, the computer program product is stored on a computer-readable recording medium.

We further describe an apparatus for producing a three-dimensional workpiece via an additive layer manufacturing method, the apparatus comprising: a carrier configured to receive material for producing the three-dimensional workpiece; a material supply unit configured to supply material to the carrier and/or one or more preceding material layers on top of the carrier, a layer depositing mechanism for forming the supplied material into a material layer on top of the carrier and/or the one or more preceding material layers on top of the carrier, a solidification device configured to solidify the material supplied to the carrier and/or the one or more preceding material layers on top of the carrier for producing the three-dimensional workpiece, a gas supply unit configured to supply a shielding gas to an area of the material layer that is to be solidified by the solidification device, a process chamber comprising the gas supply unit and the solidification device, and the computer-readable recording medium on which the computer program product is stored as outlined above.

The apparatus may be configured to implement the method according to any one of more of the example implementations as described throughout the present disclosure.

We further describe a method comprising providing data for implementing the method according to any one of more of the example implementations as described throughout the present disclosure using an apparatus for producing a three-dimensional workpiece via an additive layer manufacturing method, in particular the aforementioned apparatus.

We further describe a method for producing a three-dimensional workpiece using an additive layer manufacturing technique, wherein the method comprises: defining an irradiation section, in particular an irradiation stripe, on a material layer to be irradiated, using the additive layer manufacturing process, with an irradiation beam scanned across the material layer; and defining, within the irradiation section, one or more (for example parallel or substantially parallel) scanning vectors for said scanning of a said irradiation beam across the material layer; wherein, when a said scanning vector lies in a first area of the material layer where a layer lying (for example directly) underneath the material layer to be irradiated has already been solidified and in a second area of the material layer where the layer lying (for example directly) underneath the material layer to be irradiated has not been solidified (i.e. at the overhang area of the workpiece), a change of an irradiating beam energy density of the irradiation beam according to the scanning vector is located where the scanning vector lies in the first area. This method may be combined with any one or more of the example implementations of the method as described throughout the present disclosure. Any defects or pores may be prevented from occurring at the contour area of the workpiece, thereby improving quality of the workpiece produced.

These and other aspects of the invention will now be further described, by way of example only, with reference to the accompanying figures, in which.

Figure 1:
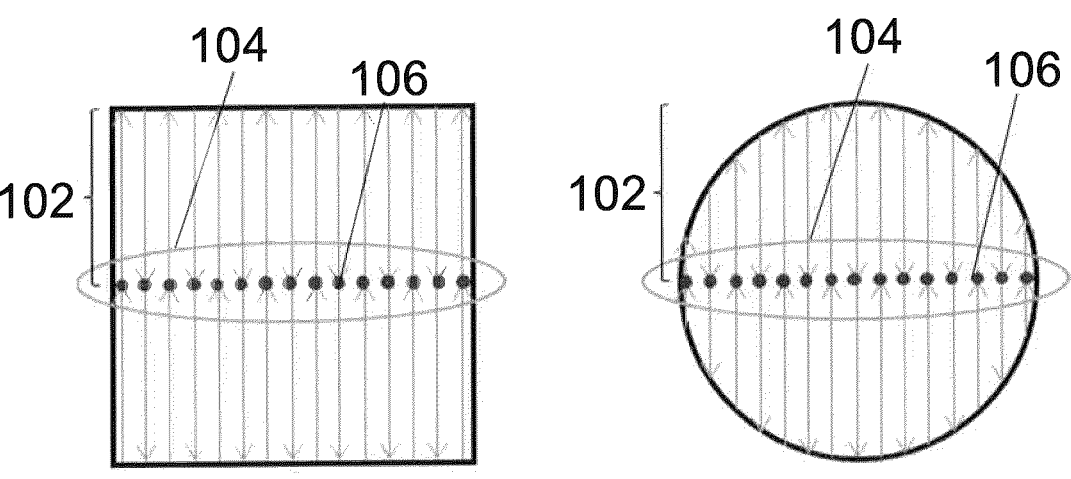
FIG. 1 shows a schematic illustration of a scanning strategy according to the prior art.

As outlined above, FIG. 1 shows a schematic illustration of a scanning strategy according to the prior art. In this example, the irradiation section for a material layer to be irradiated has a quadratic shape and a circular shape, respectively. As will be appreciated, other shapes are possible.

In this example, scanning vectors (arrows) are defined within an irradiation stripe having a width 102. The length of the scanning vectors are defined depending on the geometry of the workpiece to be produced.

As can be seen, starting points and endpoints of the scanning vectors lie on a line for each of the two examples shown. The inventors have realized that, as a result thereof, positions 106 of possible pores and/or defects may be arranged in a linear manner within an area 104.

Figure 2:
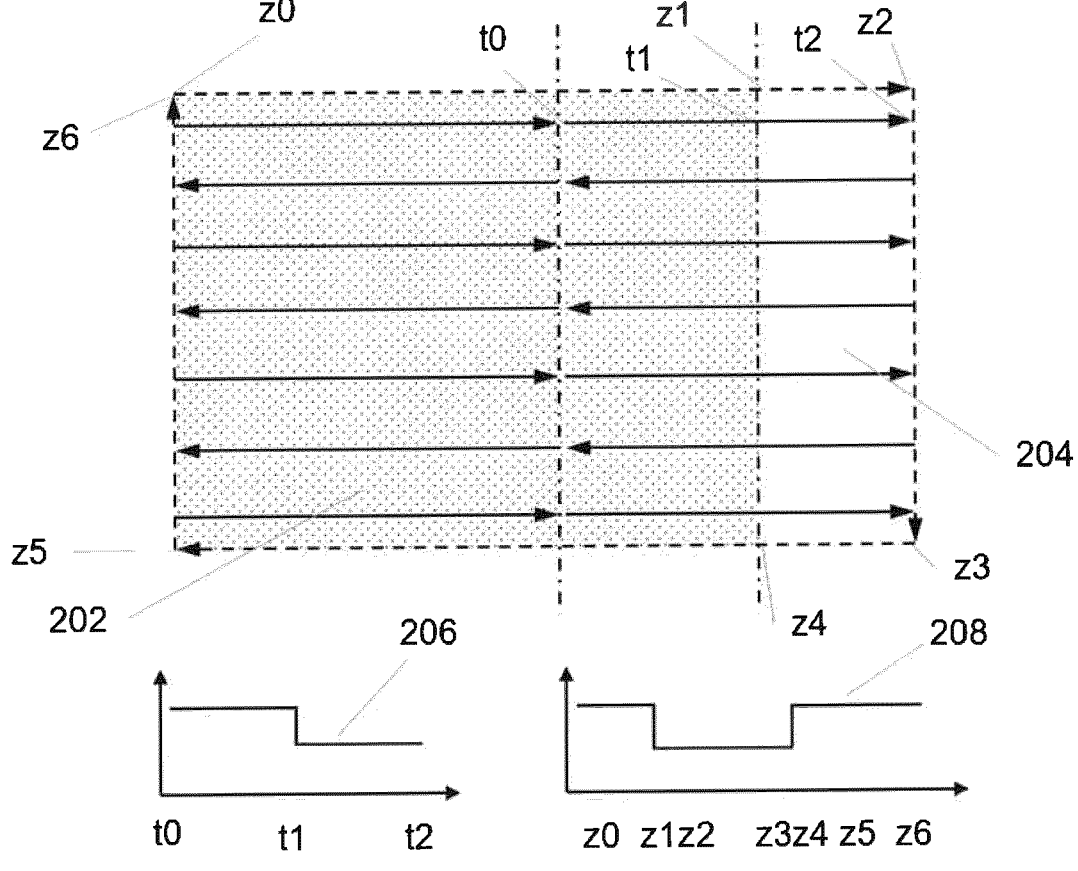
FIG. 2 shows a schematic illustration of a scanning strategy according to the prior art.

FIG. 2 shows a schematic illustration of a further scanning strategy according to the prior art.

In this example, layer 202 lying underneath the current layer to be irradiated has been solidified. An overhang 204 is created in this example due to the geometry of the workpiece to be produced using the additive layer manufacturing technique.

A filling vector 206 is indicated to be reduced in irradiation energy density at position t1 when the irradiation beam is scanned from a position t0 to position t2. Similarly, a contour vector 208 is shown to be reduced in irradiation energy density at position z1, and raised again at position z4.

As can be seen, in an area where the overhang is to be created, the irradiation beam energy density is reduced for the area with the overhang.

In this example, starting points and endpoints of various vectors are arranged on a line (in this example where position t0 is located).

Pore chains have repeatedly occurred in solidified material layers, even if the parameters are optimized in such a way that no defects between stripes occur.

Therefore, example implementations according to the present disclosure relate in particular to a scanning strategy in which, according to some examples, and irradiation stripe width and/or a scanning vector length may be varied.

Generally, the aim of the scanning strategy according to example implementations as described herein is to ensure that the starting points and endpoints of neighboring vectors or points of an irradiation energy density change on neighboring vectors within a stripe are not directly adjacent to each other, but, in some examples, as far apart as possible, and that they are not arranged on a line over several scanning vectors.

By varying vector lengths (irrespectively of a geometry of the workpiece to be produced using an additive layer manufacturing process) within a stripe or an area in which the starting points and endpoints of the scanning vectors of adjacent stripes are arranged, pores or defects that are lined up in a row may be avoided. This may allow for improving the mechanical properties by reducing the chances of otherwise occurring breaking points.

In addition, the type of scanning strategy as described herein may increase the tolerance to hardware or process influences. The influence of slightly varying beam diameters (from machine to machine) or varying melt pool sizes, which are caused by various process influences, such as short-term poor gas flow and thus poorer absorption, can be minimized. Furthermore, the influence of different scanning vectors not being synchronized with the movement of the irradiation beam may also be minimized. Furthermore, variations in the optics (for example scanning optics) and/or the solidification device (for example laser) may advantageously be compensated for.

Figure 3:
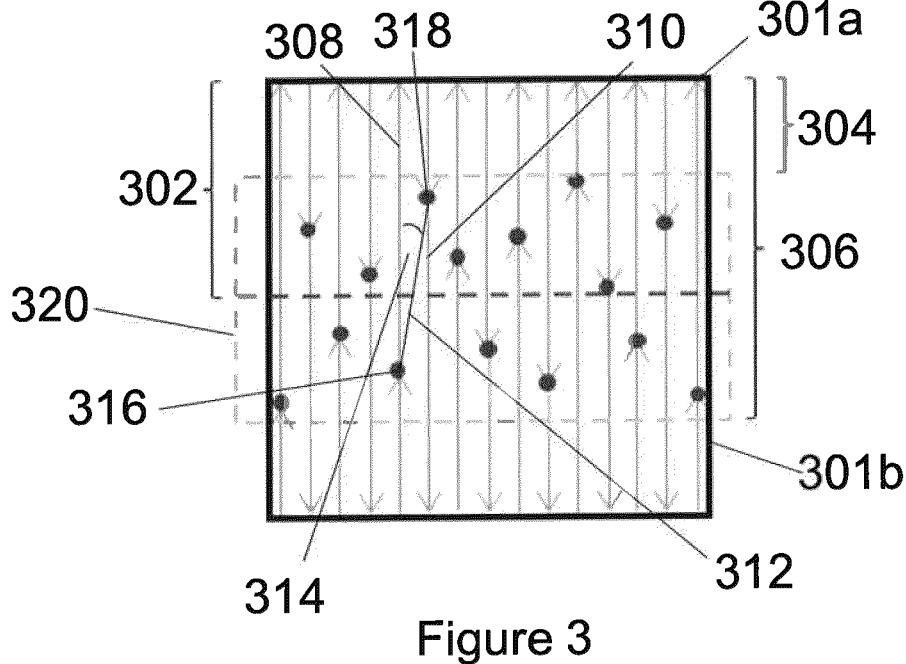
FIG. 3 shows a schematic illustration of a scanning strategy according to example implementations as described throughout present disclosure.

FIG. 3 shows a schematic illustration of a scanning strategy according to example implementations as described throughout present disclosure.

In this example, an irradiation sections 301a and 301b are defined within which a material layer is to be solidified.

Each irradiation section is shaped, in this example, as a stripe with a stripe width 302.

A plurality of scanning vectors is provided within each of the irradiation sections, Each scanning vector has a minimum scanning vector length 304 and a maximum scanning vector length 306.

In this example, starting points and endpoints of the scanning vectors of a stripe are randomly distributed within a defined area 320.

An imaginary line 312 is formed in this example between the starting point 316 of scanning vector 308 and the starting point 318 of scanning vector 310. In this example, the line 312 and the scanning vector 308 (and equally the line 312 and the scanning vector 310) form an angle 314 therebetween which deviates from 90 degrees. In this example, the angle is approximately 10 degrees.

In this example, the size of the defined area 320 depends on the defined minimum and maximum scanning vector lengths.

As the starting points and endpoints of the scanning vectors are randomly distributed within the defined area 320, any defects or pores are evenly distributed such that a linear arrangement thereof may be avoided.

Figure 4:
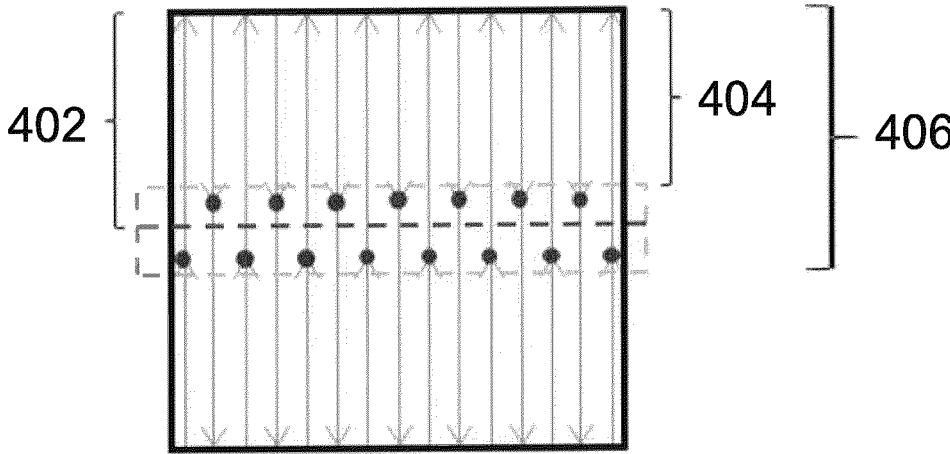
FIG. 4 shows a schematic illustration of a further scanning strategy according to example implementations as described throughout present disclosure.

FIG. 4 shows a schematic illustration of a scanning strategy according to further example implementations as described throughout present disclosure.

In this example, starting points and endpoints of the scanning vectors move for every second scanning vector of the scanning stripe with a width 402. Also, in this example, a minimum scanning vector length 404 and a maximum scanning vector length 406 are provided. The starting points and endpoints of the scanning vectors are at the same height for every second scanning vector.

In this example, closely spaced pores or defects may be reduced to some extent.

Figure 5:
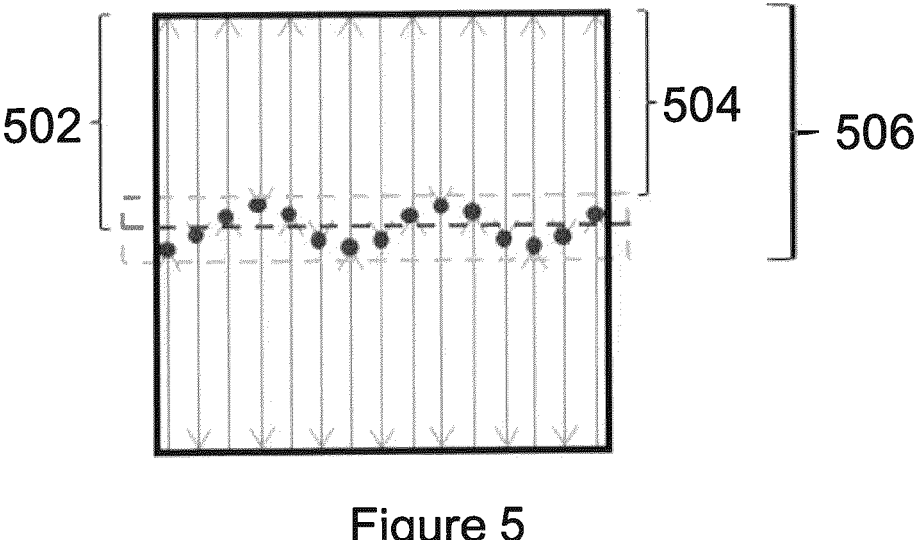
FIG. 5 shows a schematic illustration of a further scanning strategy according to example implementations as described throughout present disclosure.

FIG. 5 shows a schematic illustration of a scanning strategy according to further example implementations as described throughout present disclosure.

In this example, starting points and endpoints of the scanning vectors be on a sinusoidal curve for a scanning stripe with a width 502. A straight line made up of possible defects or pores may be avoided by using this scanning strategy.

Also, in this example, a minimum scanning vector length 504 and a maximum scanning vector length 506 are provided.

Figure 6:
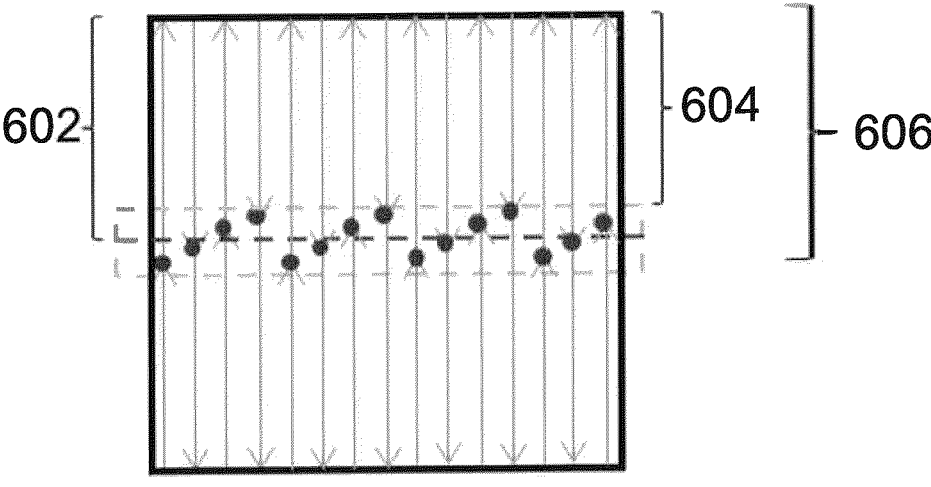
FIG. 6 shows a schematic illustration of a further scanning strategy according to example implementations as described throughout present disclosure.

FIG. 6 shows a schematic illustration of a scanning strategy according to further example implementations as described throughout present disclosure.

In this example, starting points and endpoints of the scanning vectors of a stripe with a width 602 are arranged in a zick-zack pattern. A linear arrangement of pores or defects may be interrupted by an offset after every x-th scanning vector (in this example with an offset after four scanning vectors).

Also, in this example, a minimum scanning vector length 604 and a maximum scanning vector length 606 are provided.

Generally, in various example implementations according to the present disclosure, seen over a defined area, the starting points and endpoints (located within a certain area of the irradiation section) are as evenly distributed as possible. As will be appreciated, the starting points and/or endpoints of scanning vectors in any of the example implementations as described herein may equally refer to a change in irradiation beam energy density (from a first value different from zero to a second value different from zero and larger or smaller than the first value) along a scanning path according to a scanning vector.

Using the scanning strategy according to example implementations as described herein, a distance between any defects or pores may be increased.

The scanning strategy as described herein may be particularly advantageous for an overhanging contour area of a workpiece to be produced using the additive layer manufacturing technique. Production of close contour, overhanging workpiece areas may be supported conventionally. These support structures, which have to be added to the workpiece, may lead to increased powder consumption, longer production time and increased effort in the post-processing of the workpiece.

Scanning strategies according to example implementation implementations as described herein may allow for reducing required support structures by means of the advantageous scanning strategy for use in (near-)contour, overhanging areas. A particular scanning strategy in the solid part of a workpiece can also help to eliminate anomalies.

The scanning strategy according to example implementations as described throughout the present disclosure may allow in particular manufacturing overhanging contour areas to prevent anomalies to be arranged on a line, which may otherwise result in fragile workpiece components.

Figure 7:
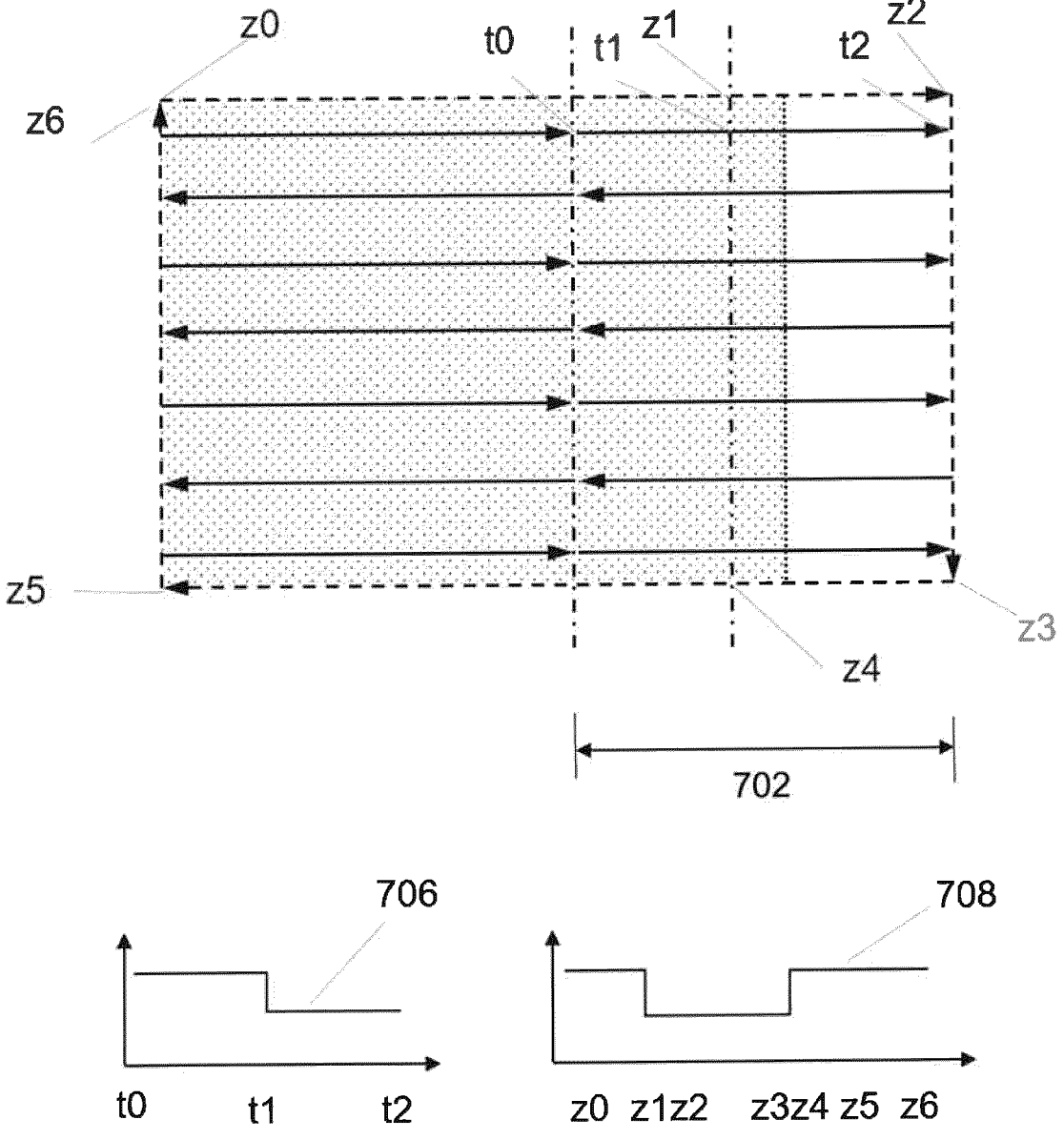
FIG. 7 shows a schematic illustration of a further scanning strategy according to example implementations as described throughout present disclosure.

FIG. 7 shows a schematic illustration of a scanning strategy according to further example implementations as described throughout present disclosure.

In this example, a scanning stripe with a width 702 covers an overhang area, in which a first part includes a solidified layer underneath the layer to be irradiated (dotted area) and a non-solidified underneath the layer to be irradiated (blank area).

As can be seen, in this example, the irradiation beam energy density is reduced already over the area with solidified material layer underneath the layer to be irradiated (see irradiation beam energy density vs location for filling vector 706). The same applies to the contour vector 708, the irradiation beam energy density for which is reduced, for example, at position z1. It should be noted that for reasons of clarity only one contour vector 708 is shown, although in some examples it is also possible that on the workpiece contour the irradiation follows more neighboring paths, for example three parallel paths or even five or more neighboring paths. For vectors pointing opposite from the contour to the inside of the workpiece the irradiation beam energy may not be increased until over the area with solidified material layer underneath the layer to be irradiated.

Figure 8:
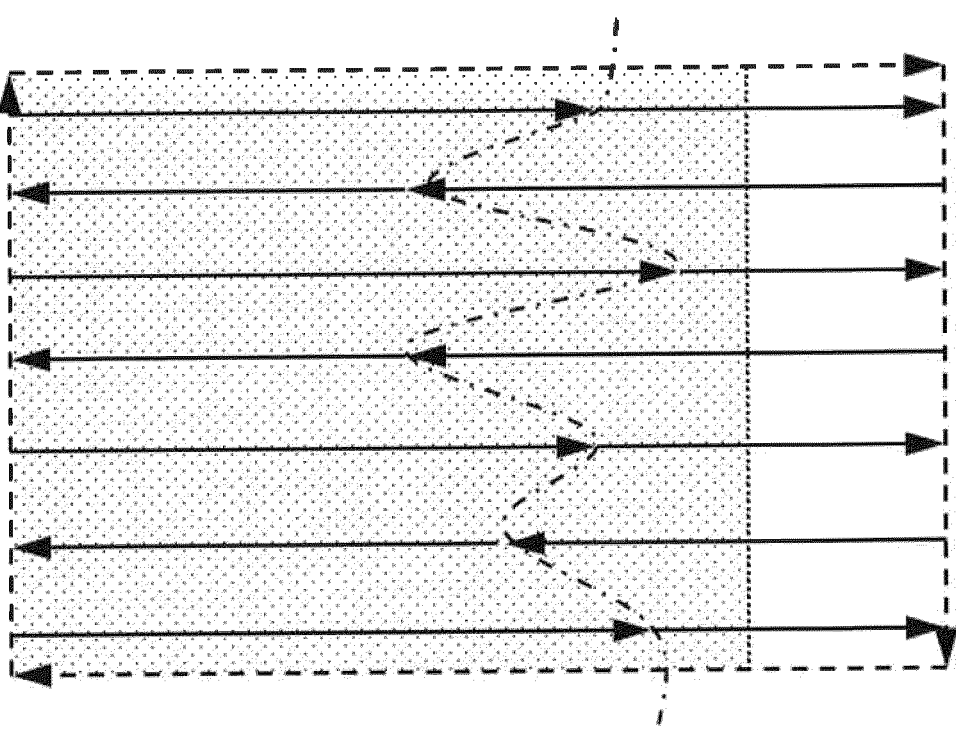
FIG. 8 shows a schematic illustration of a further scanning strategy according to example implementations as described throughout present disclosure.

FIG. 8 shows a schematic illustration of a preferred scanning strategy according to further example implementations as described throughout present disclosure.

In this example, for the irradiation stripe which covers the overhang area, the scanning vectors are defined with different starting points and endpoints in a wavelike manner at least for some scanning vectors. Additionally, the irradiation beam energy density may be reduced over the area with non-solidified material layer lying underneath, as in the example of FIG. 7. In particular the irradiation beam energy density of the scanning vectors of the irradiation stripe which covers the overhang area may be at a constant energy density lower than the irradiation beam energy density of the scanning vectors of the irradiation stripe which is over solid material.

Figure 9:
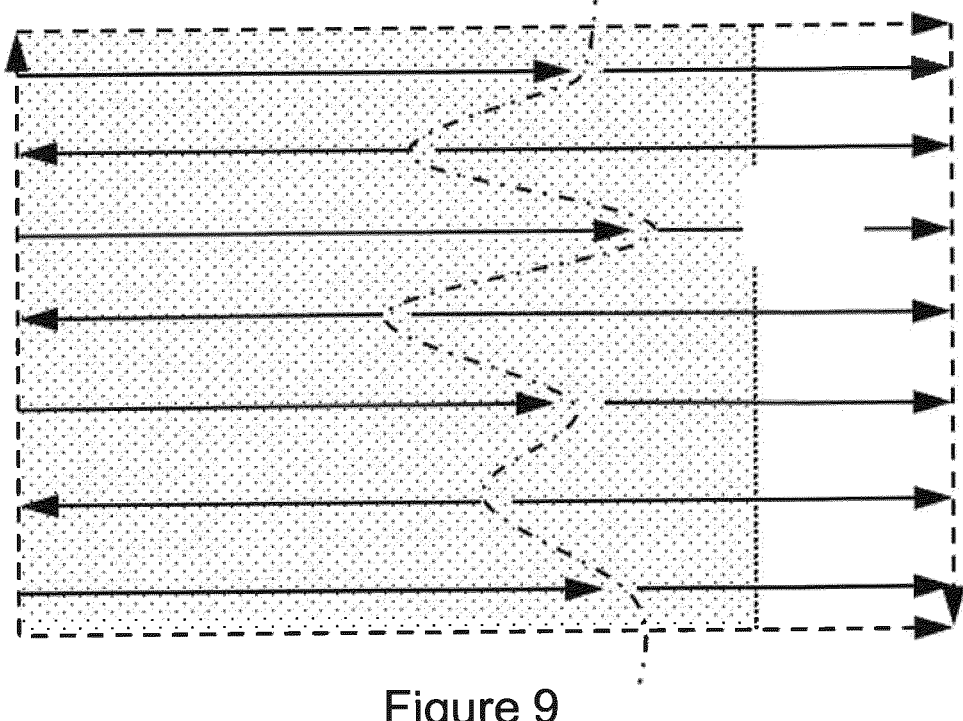
FIG. 9 shows a schematic illustration of a further scanning strategy according to example implementations as described throughout present disclosure.

FIG. 9 shows a schematic illustration of a scanning strategy according to further example implementations as described throughout present disclosure.

In this example, the scanning vectors are defined such that they are arranged unidirectional in the direction of the workpiece contour. The scanning strategies of FIG. 7 and/or FIG. 8 may additionally be implemented in the scanning strategy of FIG. 9.

Figures 10, 11:
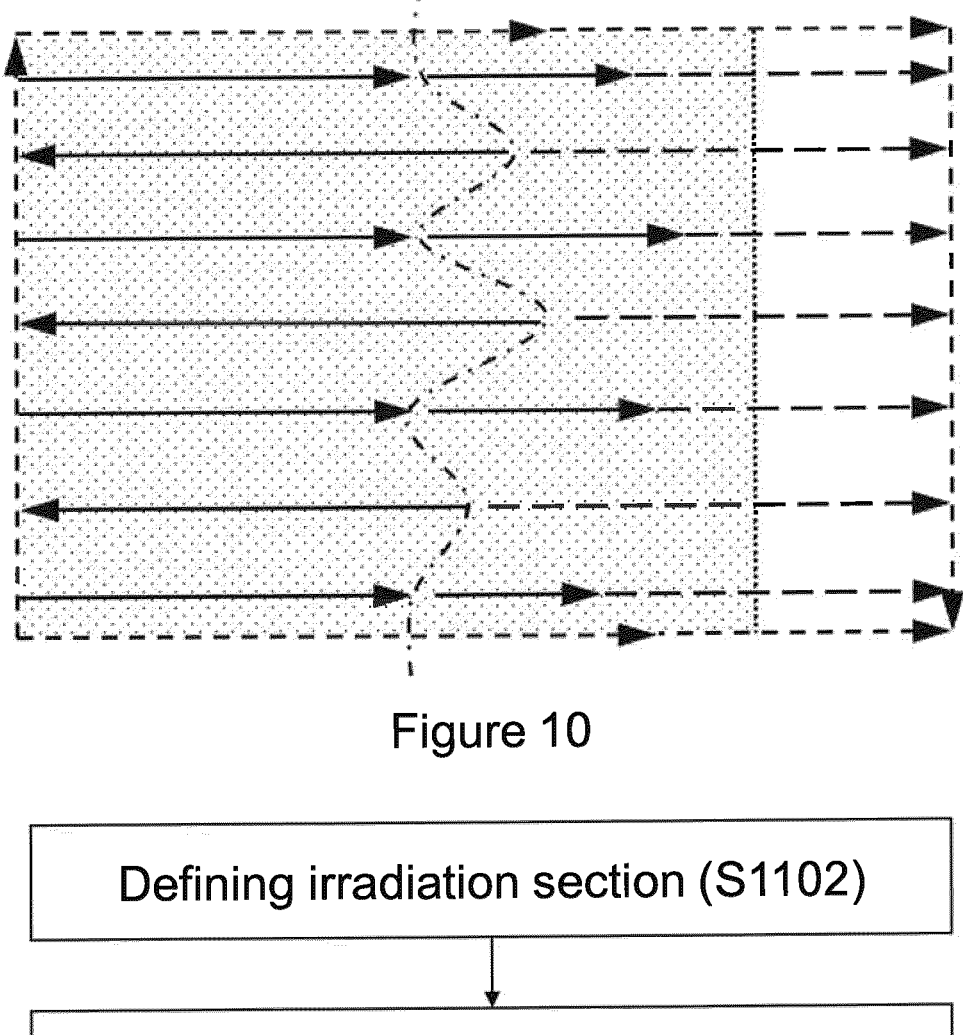
FIG. 10 shows a schematic illustration of a further scanning strategy according to example implementations as described throughout present disclosure.
FIG. 11 shows a flow diagram of a method according to example implementations as described throughout present disclosure.

FIG. 10 shows a schematic illustration of a scanning strategy according to further example implementations as described throughout present disclosure.

In this example, the irradiation stripe covering the overhang area partially includes scanning vectors arranged behind one another, whereby the second scanning vector covering the contour of the workpiece is defined with a reduced irradiation energy density compared to the first scanning vector being entirely arranged over the area with solidified material underneath the layer to be irradiated.

Based on the above-outlined examples, the filling vectors may be defined as adjacent scanning vectors in an irradiation stripe having different locations of irradiation energy density change (e.g. stating point and/or endpoint of a scanning vector) independent of the workpiece geometry. This may result in, for example, different lengths and/or starting points and/or endpoints of the scanning vectors.

In some examples, the lengths, starting points and/or end points may be defined randomly or according to a specific pattern (e.g. sine curve with any amplitude and frequency), as outlined above. This may be particularly advantageous for irradiation stripes which are located along an overhanging contour.

When executed along an overhanging contour area, several irradiation stripes according to the present disclosure are preferably placed next to each other.

Although the shown examples comprise in the neighboring irradiation areas, i.e. irradiation stripes, the same amount of vectors with the same distances, it should be noted that it is possible that the irradiation areas could also comprise a different number of vectors with different distances to change an irradiation energy density between the irradiation areas. In particular, an irradiation area in an overhanging contour area could comprise a different number of vectors than an irradiation area over solid material. It is clear that also other parameters to control an irradiation energy density could (alternatively or additionally) be varied as mentioned above.

A bidirectional irradiation up to a certain overhang angle, and then only a unidirectional irradiation in the direction of the workpiece contour may be preferred. This may allow for uniform irradiation in the area of the workpiece contour, thereby improving quality of the workpiece.

The different starting points (and/or endpoints) especially for unidirectional scanning vectors may be chosen to avoid the problem of a continuous initial superelevation or anomaly.

Abrupt reduction of irradiation beam power/energy density in an area in front of the overhanging contour area at different points for adjacent scanning vectors may be preferred in order to avoid a linear arrangement of possible pores or defects.

Alternatively or additionally to the irradiation beam power reduction, splitting of scanning vectors into two scanning vectors to be irradiated directly one after the other may be implemented, whereby the first vector is exposed with a normal irradiation beam power and the following vector with reduced irradiation beam power.

With bi-directional irradiation, a selection of long scanning vectors for irradiation towards the inside/central part of the workpiece may be preferred. Relatively shallow irradiation sections/stripes may thus be avoided to thereby spread out any possible defects or pores as much as possible.

With a bidirectional irradiation, the irradiation beam energy density for scanning vectors running inwards away from the workpiece contour may be increased from a certain location onwards. This may be analogous to the reduction for scanning vectors running outwards from the workpiece contour.

For external contours, in the most general case, contours may lead along areas with solidified ground/layers as well as along areas with not yet solidified layers underneath. At the transition between these contour areas, the irradiation beam power/energy density may be changed according to the procedure for hatches in a scanning strategy for producing a workpiece using an additive layer manufacturing technique. If the point of impact of the energy irradiation is in the solid part (i.e. the material underneath the layer to be irradiated is solid) and close to the transition to the not yet solidified area (underneath the layer to be irradiated), the irradiation beam power may still be changed in the solid part of the contour irradiation. If the location of the energy irradiation is in the not yet solidified area and a transition to the solidified area is imminent, the irradiation beam power may be changed to the usual value in the solid area—this may be applied to filling vectors and/or contour vectors. To ensure that the transitions in each layer take place at different locations in the solid subarea, the location may be varied from layer to layer, whereby the distance of the energy density input change location from the real transition location of the contour area on the solid area to the non-solidified area is different from zero.

Scanning strategies according to example implementations as described herein may allow for preventing anomalies along the hatch boundary and thus a more homogeneous material structure and avoidance of defects or pores in particular in a linear arrangement.

FIG. 11 shows a flow diagram of a method 1100 according to example implementations as described throughout present disclosure.

In this example, an irradiation section is defined at step S1102 on a material layer to be irradiated, in an additive layer manufacturing process, with an irradiation beam scanned across the material layer.

At step S1104, two or more parallel or substantially parallel scanning vectors for said scanning of a said irradiation beam across the material layer are defined within the irradiation section.

Based on said defining of the two or more parallel or substantially parallel scanning vectors, a line is defined which connects a first location, on the material layer, of a change in irradiation energy density of a said irradiation beam for a first one of the two or more parallel or substantially parallel scanning vectors and a second location, on the material layer, of a change in irradiation energy density of a said irradiation beam for a second one of the two or more parallel or substantially parallel scanning vectors, wherein the first scanning vector and the second scanning vector are neighboring scanning vectors, wherein a distance between the first location and the second location is smaller than (i) a distance between the first location and a third location of a change in irradiation energy density of a said irradiation beam for the second one of the two or more parallel or substantially parallel scanning vectors and/or (ii) a distance between the second location and a fourth location of a change in irradiation energy density of a said irradiation beam for the first one of the two or more parallel or substantially parallel scanning vectors, and wherein an angle, which differs from 90 degrees irrespectively of a geometry of a workpiece to be produced using the additive layer manufacturing process, is formed (i) between the first scanning vector and the line, and/or (ii) between the second scanning vector and the line. In some examples, after defining one or more hatches which are then filled with one or more scanning vectors, the length of the one or more scanning vectors is checked. The one or more hatches may then be adjusted in order to avoid scanning vectors having a length below a predefined threshold.

At step S1106, the material layer is irradiated according to the defined two more scanning vectors.

Figure 12:
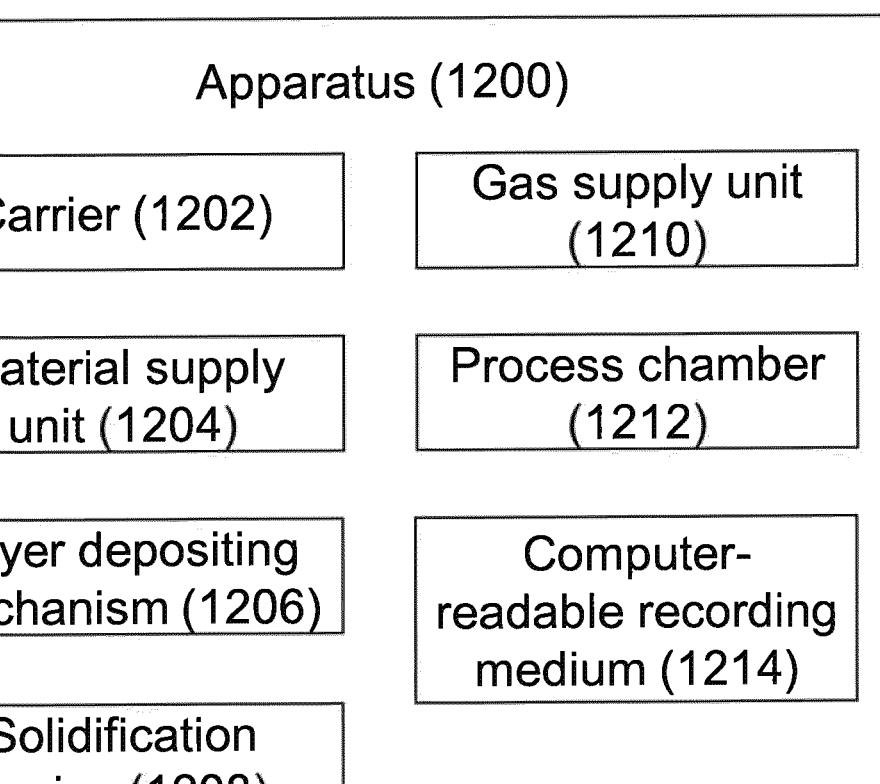
FIG. 12 shows a schematic block diagram of an apparatus according to example implementations as described throughout present disclosure.

FIG. 12 shows a schematic block diagram of an apparatus 1200 according to example implementations as described throughout present disclosure.

In this example, the apparatus 1200 is used to produce a three-dimensional workpiece via an additive layer manufacturing method.

The apparatus 1200 comprises a carrier 1202 which is configured to receive material for producing the three-dimensional workpiece. The apparatus 1200 further comprises a material supply unit 1204 configured to supply material to the carrier 1202 and/or one or more preceding material layers on top of the carrier 1202.

A layer depositing mechanism 1206 is provided for forming the supplied material into a material layer on top of the carrier 1202 and/or the one or more preceding material layers on top of the carrier 1202.

The apparatus 1200 further comprises, in this example, a solidification device 1208 configured to solidify the material supplied to the carrier 1202 and/or the one or more preceding material layers on top of the carrier 1202 for producing the three-dimensional workpiece. The solidification device 1208 may comprise one or more lasers and/or one or more particle (for example electron) beam sources.

The apparatus 1200 further comprises, in this example, a gas supply gait 1210 configured to supply a shielding gas to an area of the material layer that is to be solidified by the solidification device 1208.

The apparatus 1200 further comprises, in this example, a process chamber 1212 in which the three-dimensional workpiece may be produced using the additive layer manufacturing method. In some examples, the carrier 1202 and/or the material supply unit 1204 and/or the layer depositing mechanism 1206 and/or the solidification device 1208 and/or the gas supply unit 1210 may be provided within the process chamber 1212.

The apparatus 1200 further comprises, in this example, a computer-readable recording medium 1214 in which computer program product comprising program code portions is included for performing the method according to any one of the example implementations as described herein when the computer program product is executed on one or more computing devices.

Figure 13:
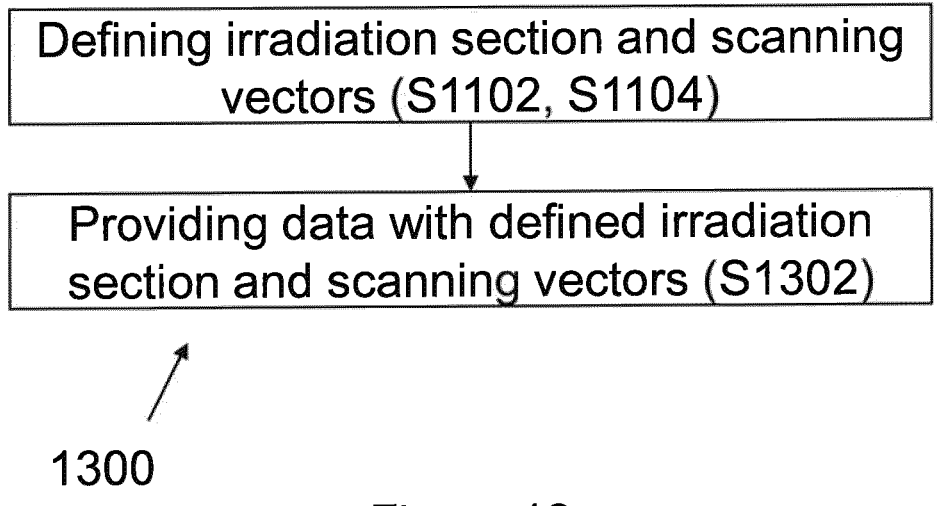
FIG. 13 shows a flow diagram of a method according to example implementations as described throughout present disclosure.

FIG. 13 shows a flow diagram of a method 1300 according to example implementations as described throughout present disclosure.

In this example, an irradiation section and scanning vectors are defined as outlined above in steps S1102 and S1104 of method 1100. The method 1300 further comprises providing data for implementing the method according to any one of the example implementations as described herein using an apparatus for producing a three-dimensional workpiece via an additive layer manufacturing method, in particular the apparatus as shown in FIG. 12.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. A method comprising:

defining an irradiation section on a material layer to be irradiated, in an additive layer manufacturing process, with an irradiation beam scanned across the material layer, and defining, within the irradiation section, two or more parallel or substantially parallel scanning vectors for said scanning of a said irradiation beam across the material layer, wherein all scanning vectors within the irradiation section are parallel or substantially parallel with respect to each other, wherein, based on said defining of the two or more parallel or substantially parallel scanning vectors, a line results which connects a first location, on the material layer, of a change in irradiation energy density of a said irradiation beam for a first one of the two or more parallel or substantially parallel scanning vectors and a second location, on the material layer, of a change in irradiation energy density of a said irradiation beam for a second one of the two or more parallel or substantially parallel scanning vectors, wherein the first scanning vector and the second scanning vector are neighboring scanning vectors, wherein a distance between the first location and the second location is smaller than (i) a distance between the first location and a third location of a change in irradiation energy density of a said irradiation beam for the second one of the two or more parallel or substantially parallel scanning vectors and/or (ii) a distance between the second location and a fourth location of a change in irradiation energy density of a said irradiation beam for the first one of the two or more parallel or substantially parallel scanning vectors, and wherein an angle, which differs from 90 degrees (a) irrespectively of a geometry of a workpiece to be produced using the additive layer manufacturing process, and (b) irrespectively of an orientation of the two or more parallel or substantially parallel scanning vectors with respect to an orientation of the irradiation section, is formed (i) between the first scanning vector and the line, and/or (ii) between the second scanning vector and the line, the method further comprising:

irradiating the material layer with the irradiation beam according to the two or more scanning vectors, wherein the irradiation section is defined to comprise an over-hanging contour area of the workpiece to be produced from the material layer using the additive layer manu-facturing process, the overhanging contour area being defined in the material layer, wherein a starting point of one of said two or more scanning vectors in an area in which the contour is to be formed from the material layer is located where material has been solidified in a layer lying directly underneath the material layer, and wherein an endpoint of said one of said two or more scanning vectors is located where material has not been solidified in the layer lying directly underneath the material layer.

2. A method as claimed in claim 1, wherein a said angle differing from 90 degrees is formed based on each pair of neighboring scanning vectors of the two or more scanning vectors.

3. A method as claimed in claim 1, wherein the angle differs from 90 degrees by at least 5 degrees.

4. A method as claimed in claim 1, wherein a said change in irradiation energy density comprises a said scanning vector starting and/or ending at a respective said location.

5. A method as claimed in claim 1, wherein the angle being formed to be different from 90 degrees is based on a) defining the first one and the second one of the two or more parallel or substantially parallel scanning vectors to have (i) different respective lengths and/or (ii) different respective starting points and/or (iii) different respective endpoints, and/or b) a said starting point of one of the first one and the second one of the scanning vectors being different from a said endpoint of the other one of the first one and the second one of the scanning vectors.

6. A method as claimed in claim 1, further comprising defining an area within the irradiation section, wherein the first location and the second location are located within the area along respective straight lines on which the respective first one of the two or more scanning vectors and the second one of the two or more scanning vectors are defined.

7. A method as claimed in claim 6, wherein the first location and the second location are arranged randomly within the area.

8. A method as claimed in claim 6, wherein said locations are distributed uniformly within the area.

9. A method as claimed in claim 6, wherein a connection of a said location of every second scanning vector forms a straight line.

10. A method as claimed in claim 6, wherein said loca-tions are located on the material layer according to a wave-like curve or according to a zick-zack pattern.

11. A method as claimed in claim 1, wherein a distance between the first location and the second location is above a predefined threshold.

12. A method as claimed in claim 1, wherein a length of each of the two or more scanning vectors is (i) equal to or larger than a minimum length, and/or (ii) equal to or smaller than a maximum length.

13. A method as claimed in claim 12, further comprising defining an area within the irradiation section, wherein the first location and the second location are located within the area along respective straight lines on which the respective first one of the two or more scanning vectors and the second one of the two or more scanning vectors are defined, wherein a dimension of the area equals to a difference between the maximum length and the minimum length.

14. A method as claimed in claim 1, wherein, when the irradiation section is defined to comprise a said overhanging contour area and when an overhang angle of the overhang-ing contour area is above a threshold angle, said irradiation comprises a unidirectional irradiation towards the overhang-ing contour.

15. A method as claimed in claim 1, wherein, when the irradiation comprises a bidirectional irradiation, a length of a said scanning vector pointing towards a center or center region of the workpiece is above a threshold length and/or wherein a said irradiation energy density increases from a starting point of the scanning vector to an endpoint of the scanning vector pointing towards the center or center region of the workpiece.

16. A method as claimed in claim 1, wherein, when the irradiation beam is scanned across the material layer at a location at which material underneath the material layer has already been solidified but within a predefined distance from a location at which material underneath the material layer has not yet been solidified, a said first and/or second location of a said change in irradiation energy density is defined on the material layer at a said location at which material underneath the material layer has already been solidified.

\* \* \* \* \*